(12) United States Patent
Prokopenko et al.

(10) Patent No.: US 7,098,924 B2
(45) Date of Patent: Aug. 29, 2006

(54) METHOD AND PROGRAMMABLE DEVICE FOR TRIANGLE INTERPOLATION IN HOMOGENEOUS SPACE

(75) Inventors: Boris Prokopenko, Milpitas, CA (US); Timour Paltashev, Fremont, CA (US); Derek Gladding, San Francisco, CA (US)

(73) Assignee: VIA Technologies, Inc., (TW)

( * ) Notice: Subject to any disclaimer, the term of this patent is extended or adjusted under 35 U.S.C. 154(b) by 64 days.

(21) Appl. No.: 10/671,190

(22) Filed: Sep. 24, 2003

(65) Prior Publication Data

US 2004/0145589 A1    Jul. 29, 2004

Related U.S. Application Data

(60) Provisional application No. 60/419,881, filed on Oct. 19, 2002.

(51) Int. Cl.
*G09G 5/00*    (2006.01)

(52) U.S. Cl. ............... 345/581; 345/423; 345/426; 345/427; 345/428; 345/582; 345/589; 345/606; 345/612; 345/614; 382/277; 382/293

(58) Field of Classification Search ........ 345/606–610, 345/614, 612; 382/277
See application file for complete search history.

(56) References Cited

U.S. PATENT DOCUMENTS 5,361,368 A     11/1994  Herzl et al. ................. 395/800
5,361,386 A     11/1994  Watkins et al. .............. 395/130
5,550,960 A  *   8/1996  Shirman et al. ............. 345/852
5,877,773 A      3/1999  Rossin et al. ................ 345/434
6,137,497 A  *  10/2000  Strunk et al. ................ 345/620
6,275,235 B1     8/2001  Morgan, III ................. 345/430
6,380,936 B1     4/2002  Olynyk ....................... 345/427
6,414,683 B1 *   7/2002  Gueziec ...................... 345/428
6,646,648 B1 *  11/2003  Donham ...................... 345/582
6,664,958 B1 *  12/2003  Leather et al. .............. 345/422
6,686,924 B1 *   2/2004  Mang et al. ................. 345/620

* cited by examiner

*Primary Examiner*—Richard Hjerpe
*Assistant Examiner*—Antonio Caschera
(74) *Attorney, Agent, or Firm*—Anthony B. Diepenbrock, III; Dechert LLP

(57) ABSTRACT

A method and apparatus for obtaining an attribute in homogenous space. After obtaining the vertices of a triangle, the world space coordinates and the attribute of each vertex are transformed to homogeneous coordinates and an attribute in viewer space. Then a set of homogenous coefficients of the triangle is computed based on the viewer space vertex homogeneous coordinates, and the viewer space coordinates of each vertex are projected to coordinates in screen space. Pixels in the screen space that are affected by the projected triangle are determined. For each pixel affected by the triangle, a set of barycentric coefficients in viewer space is computed, based on the homogenous triangle coefficients, and a linear interpolation is performed based on the set of viewer space barycentric coefficients and the viewer space attributes of the triangle vertices to obtain the attribute of the pixel affected by the triangle.

36 Claims, 12 Drawing Sheets

Triangle setup and Pixel Processing

Barycentric setup principles

For each pixel of a triangle, we can express its coordinates from three vertices using the barycentric coefficients:

$$\begin{cases} x = \alpha \cdot x_1 + \beta \cdot x_2 + \gamma \cdot x_3 \\ y = \alpha \cdot y_1 + \beta \cdot y_2 + \gamma \cdot y_3 \\ \alpha + \beta + \gamma = 1 \\ 0 \leq \alpha \leq 1 \\ 0 \leq \beta \leq 1 \\ 0 \leq \gamma \leq 1 \end{cases}$$

The barycentric coefficients $\alpha$, $\beta$, $\gamma$ are universal for interpolation of any attribute of the pixel, including Z-coordinate, color, UV coordinates, etc. If we calculate them, we are able to re-calculate any attribute for the pixel from the attribute values in the vertices.

We can do it having:

$$\begin{cases} \alpha = ((x_3 - x_2) \cdot y + (y_2 - y_3) \cdot x + x_2 \cdot y_3 - x_3 \cdot y_2) \cdot \delta \\ \beta = ((x_1 - x_3) \cdot y + (y_3 - y_1) \cdot x + x_3 \cdot y_1 - x_1 \cdot y_3) \cdot \delta \\ \gamma = ((x_2 - x_1) \cdot y + (y_1 - y_2) \cdot x + x_1 \cdot y_2 - x_2 \cdot y_1) \cdot \delta \\ \delta = 1/(x_1 \cdot y_2 - x_2 \cdot y_1 + x_2 \cdot y_3 - x_3 \cdot y_2 + x_3 \cdot y_1 - x_1 \cdot y_3) \\ \alpha + \beta + \gamma = 1 \\ 0 \leq \alpha \leq 1 \\ 0 \leq \beta \leq 1 \\ 0 \leq \gamma \leq 1 \end{cases} \quad (1)$$

From now and
$i = 1 \ldots 3, j = i \bmod 3 + 1, k = j \bmod 3 + 1$ (enumeration of triangle vertices)
If we assign:

$$\begin{cases} a_i = y_j - y_k \\ b_i = x_k - x_j \\ c_i = x_j \cdot y_k - x_k \cdot y_j \end{cases} \quad (2)$$

then we can express (1) as following:

$$\begin{cases} \alpha = (a_1 \cdot x + b_1 \cdot y + c_1) \cdot \delta \\ \beta = (a_2 \cdot x + b_2 \cdot y + c_2) \cdot \delta \\ \gamma = 1 - \alpha - \beta \\ \delta = 1/(c_1 + c_2 + c_3) \end{cases} \quad (3)$$

For the perspective correction we have per pixel value of w:

FIG. 4C $$w = \frac{1}{\frac{\alpha}{w_1} + \frac{\beta}{w_2} + \frac{\gamma}{w_3}}\qquad(4)$$

Then we re-calculate the barycentric coefficients for the coordinates in homogeneous space, where pixel coordinates are:

$\tilde{x}_i = x_i \cdot w_i,$ $\tilde{y}_i = y_i \cdot w_i$ $\tilde{x} = x \cdot w$ $\tilde{y} = y \cdot w$ We shall skip the operations, which lead us to the conclusion:

$$\begin{cases} d_i = (a_i \cdot x + b_i \cdot y + c_i) \cdot w_j \cdot w_k \\ \tilde{\alpha} = \dfrac{d_1}{d_1 + d_2 + d_3} \\ \tilde{\beta} = \dfrac{d_2}{d_1 + d_2 + d_3} \\ \tilde{\gamma} = \dfrac{d_3}{d_1 + d_2 + d_3} \end{cases}\qquad(5)$$

Having $$\begin{cases} a_i = y_j - y_k \\ b_i = x_k - x_j \\ c_i = x_j \cdot y_k - x_k \cdot y_j \\ d_i = (a_i \cdot x + b_i \cdot y + c_i) \cdot w_j \cdot w_k \end{cases}$$

we can simplify $d_i = ((y_j - y_k) \cdot x + (x_k - x_j) \cdot y + x_j \cdot y_k - x_k \cdot y_j) \cdot w_j \cdot w_k \Rightarrow$ $d_i = (y_j \cdot w_j \cdot w_k - y_k \cdot w_j \cdot w_k) \cdot x + (x_k \cdot w_j \cdot w_k - x_j \cdot w_j \cdot w_k) \cdot y + x_j \cdot y_k \cdot w_j \cdot w_k - x_k \cdot y_j \cdot w_j \cdot w_k \Rightarrow$ $d_i = (\tilde{y}_j \cdot w_k - \tilde{y}_k \cdot w_j) \cdot x + (\tilde{x}_k \cdot w_j - \tilde{x}_j \cdot w_k) \cdot y + \tilde{x}_j \cdot \tilde{y}_k - \tilde{x}_k \cdot \tilde{y}_j \Rightarrow$ $$\begin{cases} \tilde{a}_i = \tilde{y}_j \cdot w_k - \tilde{y}_k \cdot w_j \\ \tilde{b}_i = \tilde{x}_k \cdot w_j - \tilde{x}_j \cdot w_k \\ \tilde{c}_i = \tilde{x}_j \cdot \tilde{y}_k - \tilde{x}_k \cdot \tilde{y}_j \\ d_i = \tilde{a}_i \cdot x + \tilde{b}_i \cdot y + \tilde{c}_i \end{cases}\qquad(6)$$

Set of $a_i$, $b_i$, $c_i$ are calculated per triangle, set of $d_i$ per pixel basis for further calculation of barycentrics according to (5).

FIG. 4D (continued)

| Number of required operations | | | | | | | | | |
|---|---|---|---|---|---|---|---|---|---|
| | Prior Art | Present Invention | | | | | | | |
| Triangle level operations | | | | | | | | | |
| MUL | 0 | 18 | | | | | | | |
| Add/Sub | 0 | 9 | | | | | | | |
| Pixel level operations | | | | | | | | | |
| MUL | 12 | 6 | | | | | | | |
| Add/Sub | 12 | 6 | | | | | | | |
| Triangle size in pixels | 1 | 2 | 4 | 8 | 16 | 32 | 64 | 128 | 256 |
| | 12 | 24 | 48 | 96 | 192 | 384 | 768 | 1536 | 3072 |
| MUL ops | 24 | 30 | 42 | 66 | 114 | 210 | 402 | 786 | 1554 |
| | 12 | 24 | 48 | 96 | 192 | 384 | 768 | 1536 | 3072 |
| Add/Sub ops | 15 | 21 | 33 | 57 | 105 | 201 | 393 | 777 | 1545 |
| Total ops: | 39 | 51 | 75 | 123 | 219 | 411 | 795 | 1563 | 3099 |
| | 24 | 48 | 96 | 192 | 384 | 768 | 1536 | 3072 | 6144 |

FIG. 5B

| # | Execution mode | Instruction Capital – long format Normal – short format | Mode and data format: Triangle, Pixel Long, Short, Mixed | Function and comments Capital – long format Normal – short format |
|---|---|---|---|---|
| 1 | Mixed Mode with mixed 18-36-bit ops <M> | MADM d, p0, P1c, p2 | Pixel mixed | d = p0*P1c + p2 P1c – long common operand for 2 short format channels according to SIMD factor for operand |
| x | Mixed | ADDM d, p0, p2 | Same | d=p0 + p2 |
| x | Mixed | SUBM d, p0, p2 | Same | d=p0 - p2 |
| 2 | Mixed | MULM d, p0, P1c | Same | d=p0*P1c |
| 3 | Mixed | MACM d, p0, P1c | Same | d=p0*P1c + macc |
| 4 | Long Mode with 36-bit operands | MADL D, P0, P1, P2 | Triangle Long Pixel Long | D=P0*P1 + P2 |
| 5 | Long | ADDL D, P0, P2 | Same | D=P0 + P2 |
| 6 | Long | SUBL D, P0, P2 | Same | D=P0 - P2 |
| 7 | Long | MULL D, P0, P1 | Same | D=P0*P1 |
| 8 | Long | MACL D, P0, P1 | Same | D=P0*P1+MACC |
| 9 | Folded Long Mode with 36-bit operands <F...L> | FMADL D, P0", P1", P2" Folded instruction has doubled set of operands | Triangle Long | D= (P0*P1 +P2) + (P0"*P1" +P2") " – operands in folding channel |
| 10 | Folded Long | FADDL D, P0", P2" | Same | D= (P0 + P2) +(P0" + P2") |
| 11 | Folded Long | FSUBL D, P0", P2" | Same | D=(P0 – P2) +(P0" – P2") |
| 12 | Folded Long | FMULL D, P0", P1" | Same | D= (P0*P1) + (P0"*P1") |
| 13 | Folded Long | FMACL D, P0", P1" | Same | D= (P0*P1+MAcc) + (P0"*P1"+MAcc") |
| 14 | Folded Blend mode Mixed preload | FBLMP D,D" x,y, P0, P1, P2, P0", P1", P2", | Same | D"= x*P"0 + y*P"1 +P2" D= x*P0 + y*P1 +P2 + D" |
| 15 | Folded Blend mode Long | FBLDL D, P0", P1", P2" | Triangle Long Similar FMADL | D= (P0"*P1" +P2") + (P0*P1 + '0') " – operands in folding channel |
| 16 | Cross Mode Long | XPRDL D, D", P0, P1 | Same | D"= P0.23*P1.01 D= P0.01*P1.23 -D" Cross product |

FIG. 6B

METHOD AND PROGRAMMABLE DEVICE FOR TRIANGLE INTERPOLATION IN HOMOGENEOUS SPACE

REFERENCE TO EARLIER APPLICATIONS

This application claims the benefit of U.S. Provisional Application Ser. No. 60/419,881, filed Oct. 19, 2002, and entitled "METHOD AND PROGRAMMABLE DEVICE FOR TRIANGLE INTERPOLATION IN HOMOGENEOUS SPACE," which application is incorporated herein by reference.

FIELD OF THE INVENTION

The present invention relates generally to graphics processing, and more particularly to triangle interpolation processing in homogeneous space.

DESCRIPTION OF THE RELATED ART

Polygon (triangle) interpolation is one of the computationally intensive tasks in graphics hardware because this interpolation is done for each pixel of each object in a scene. Each triangle may have several attributes like depth, colors, numerous textures and the quality of the image generated is greatly dependent on the accuracy of interpolation. The overall frame generation rate also depends on interpolation speed. The hardware implementation of these functions takes significant part of the gate budget of a modern graphics chip and is one the most critical parts of the chip.

Several solutions to the triangle interpolation problem have been implemented in different graphics architectures. Most of the current approaches fall into the following three categories: (i) fixed point interpolation in screen Cartesian coordinates with perspective correction; (ii) fixed point interpolation in screen barycentric coordinates with perspective correction; and (iii) fixed point interpolation in homogeneous coordinates.

Approaches in the first two categories require projecting of all parameters to screen space (i.e., division by W) for further interpolation and later perspective correction (i.e., division by 1/W) per pixel. These approaches are shown in FIGS. 1 and 2, respectively.

The third approach avoids the redundant projection of parameters to screen space with further correction and calculates the same homogeneous barycentrics, as shown in FIG. 3. Each of the above approaches performs calculations on a per pixel basis and in case of medium and large triangles requires a substantial number of calculations. Also, approaches in the three categories use significant amount of dedicated hardware for implementation, hardware which cannot be shared or used for other computing tasks.

More particularly, disadvantages of the first approach, fixed point interpolation in screen Cartesian coordinates with perspective correction, include: (a) redundant calculation with projection (division by W) of all parameters to screen space to make it linear; (b) the steps of project, interpolate, and correct to recover the true value; (c) redundant parameter delta setup calculation for interpolation including 1/W (accuracy problems arise); (d) redundant true parameter value recovery in each pixel by dividing to interpolated 1/W_pix value; and (e) a significant amount of dedicated hardware.

Disadvantages of the second approach, fixed point interpolation in screen barycentric coordinates with perspective correction, include: (a) same redundant calculation with projection (division by W) of all parameters to screen space to make it linear; (b) the steps of project, interpolate, and correct to recover the true value; (c) same redundant true parameter value recovery in each pixel by dividing to interpolated 1/W_pix value; and (d) a significant amount of dedicated hardware, which cannot be used for any other tasks.

Disadvantages of the third approach, fixed point interpolation in homogeneous coordinates, include: (a) calculations for pixel barycentrics must all have been done at the pixel level and, in the case of multi-pixel triangles, the number of calculations grows multiplicatively; and (b) a significant amount of hardware dedicated to the task.

Thus, there is a need for a method and apparatus pertaining to polygon interpolation in graphics hardware that significantly reduces the number of calculations needed and does not require a significant amount of dedicated hardware.

BRIEF SUMMARY OF THE INVENTION

The present invention is directed towards the above-mentioned need. The present invention addresses the problem of fast, accurate and efficient polygon interpolation in graphics hardware to find correct value of each parameter (Z, color, multiple texture coordinates) of every pixel of triangle. For algorithm implementation, the present invention uses a programmable single instruction multiple data (SIMD) scalar unit, which can be also used for further pixel processing according to Microsoft Dx9,10 and OpenGL API requirements for programmable graphics machines. The triangle interpolation algorithm of the present invention can be executed on this programmable SIMD scalar unit with efficiency that is close to the efficiency of dedicated hardware. In fact, all interpolation operations are executed in floating point arithmetic with the highest possible accuracy.

In accordance with a purpose of the invention as described herein, a method is provided for obtaining an attribute within a triangle. The method steps include (1) obtaining the vertices of a triangle, where each vertex is represented by a set of coordinates in a world coordinate space and has at least one attribute, (2) for each vertex, transforming the world space coordinates and the attribute of the vertex to coordinates and an attribute in viewer space to create viewer space coordinates and a viewer space attribute, where said viewer space coordinates are homogeneous coordinates, computing a set of homogeneous coefficients of the triangle based on the viewer space vertex homogeneous coordinates, where said homogenous triangle coefficients include perspective data, and projecting the viewer space coordinates of the vertex to coordinates in 2D screen space, (3) determining, in the 2D screen space, pixels that are affected by the triangle based on the 2D screen space coordinates, and (4) for each pixel affected by the triangle, computing, based on the homogeneous triangle coefficients, a set of barycentric coefficients in viewer space, and performing a linear interpolation based on the set of viewer space barycentric coefficients and the viewer space attributes of the triangle vertices to obtain the attribute of the pixel affected by the triangle.

One advantage of the present invention is the invention uses fewer arithmetic operations compared to prior art implementations and, thus, has better performance compared to triangle interpolation in screen space and later perspective correction.

Another advantage of the present invention is that it avoids parameter projection for interpolation in screen space and further perspective correction computations to recover true value in the viewpoint space.

BRIEF DESCRIPTION OF THE DRAWINGS

These and other features, aspects and advantages of the present invention will become better understood with regard to the following description, appended claims, and accompanying drawings where:

FIGS. 4C & D together show the triangle setup and pixel processing formulae in accordance with the present invention;

FIG. 5B shows a table that tabulates the operations of FIG. 3 and FIG. 4;

FIG. 6B shows an instruction set for the programmable unit; and

DETAILED DESCRIPTION OF THE INVENTION

Figure 4A:
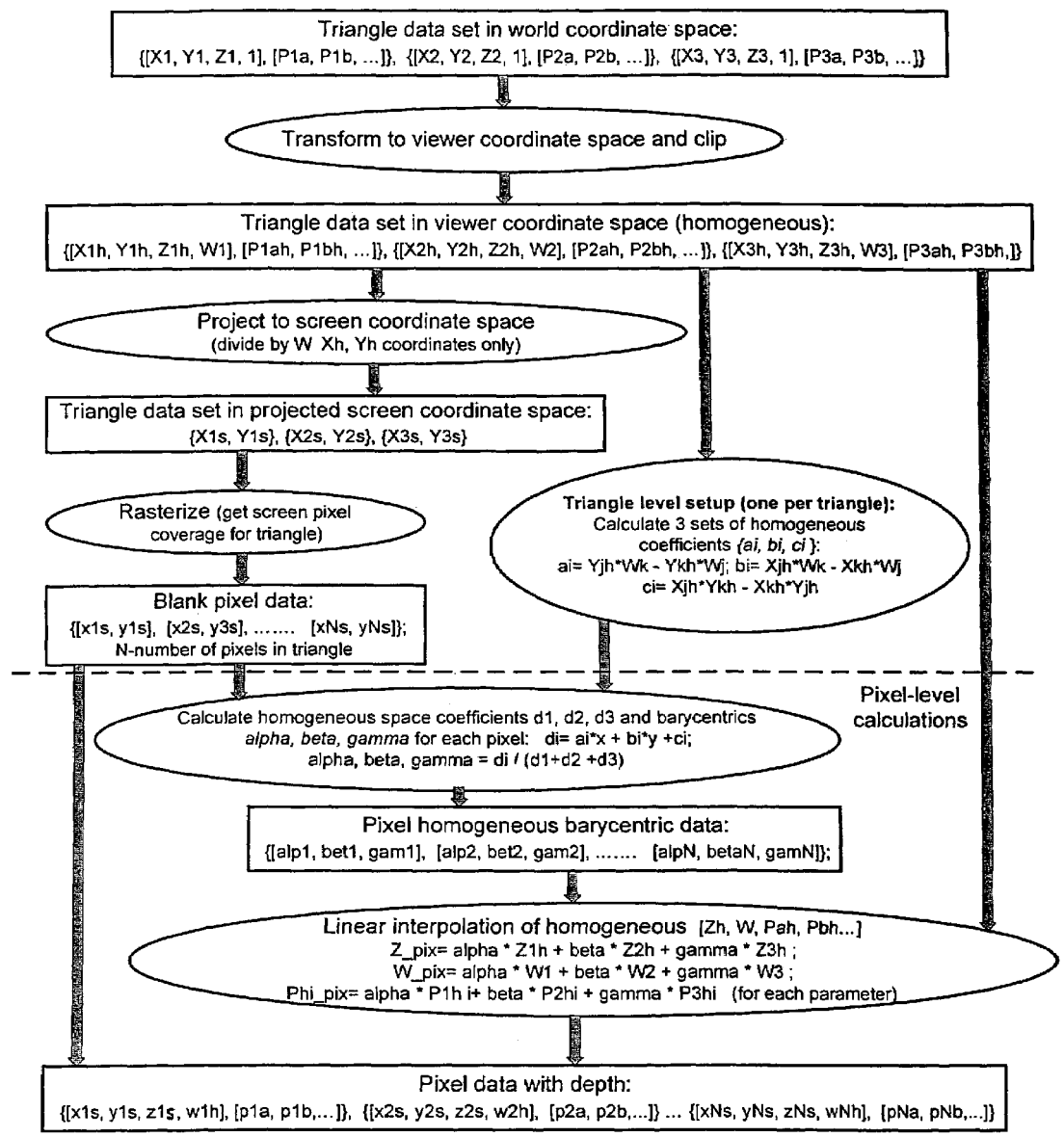
FIG. 4A shows a flow chart of an interpolation method in accordance with the present invention.

In a graphics system embodying the present invention, primitives are decomposed into triangular polygons that are further processed to provide a better representation of the images. To illustrate such processing, FIG. 4A is a flow chart of a triangle interpolation method in accordance with the present invention. Specifically, this method is for triangle rasterizing and linear parameter interpolation using barycentric coordinates in a homogenous space. According to this method, two levels of coefficient calculations take place, calculations at the triangle level and calculations at the pixel level, where certain operations occur concurrently as will be further explained below. It is noted that the steps are shown in the oval-shaped boxes and the resulting data sets are shown in the rectangular-shaped boxes.

Figure 4B:
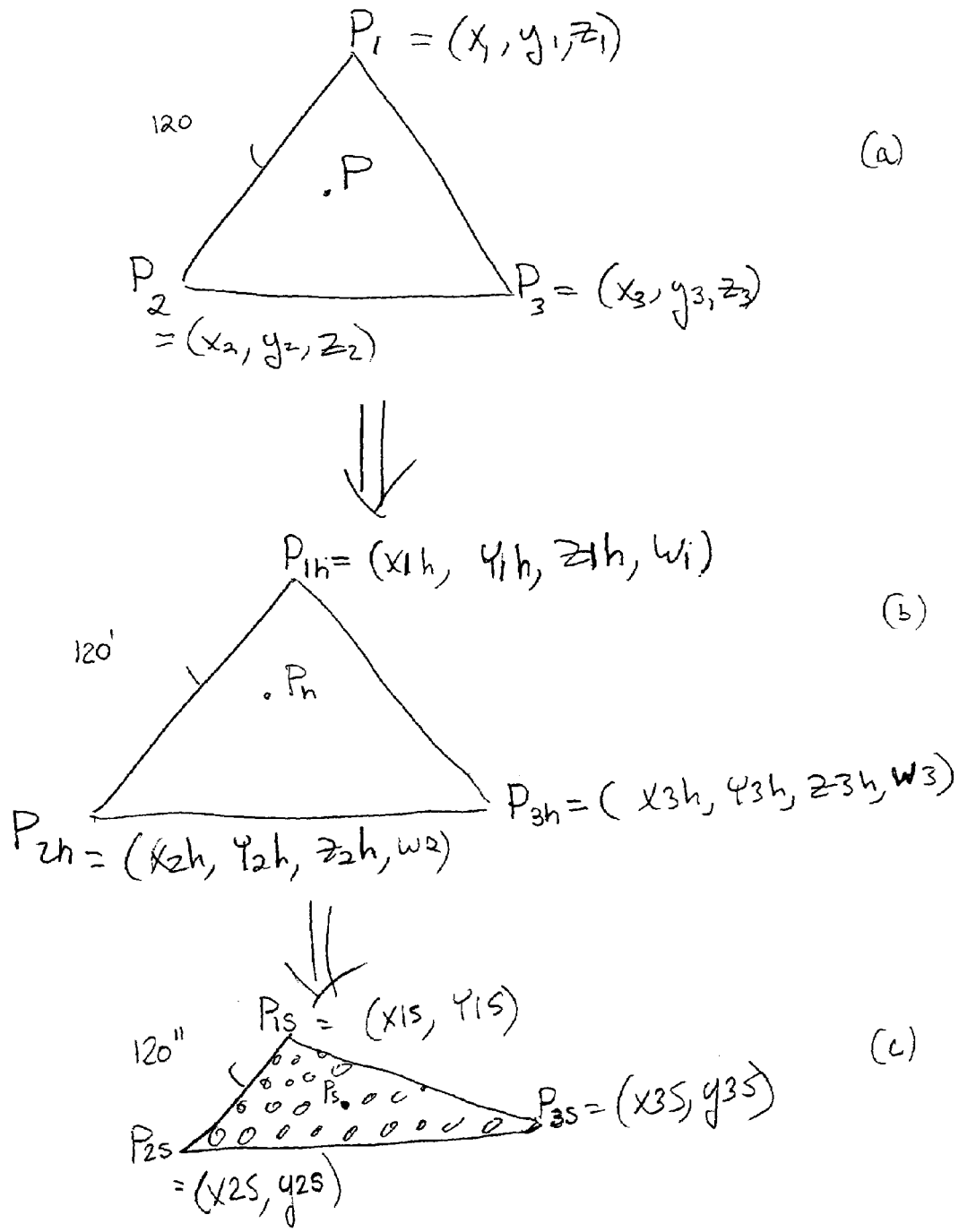
FIG. 4B illustrates the triangle in a) world coordinate space b) homogenous coordinate space and c) screen coordinate space with pixels affected by the triangle.

To allow better understanding of the method in FIG. 4A, the illustrations in FIG. 4B include the triangle in a) world coordinate space 120 b) homogenous coordinate space 120' and c) screen coordinate space with pixels affected by the triangle 120". In the world coordinate space, the triangle 120 is defined by three vertices, P1, P2, P3, with respective coordinates [X1, Y1, Z1], [X2, Y2, Z2], [X3, Y3, Z3], and respective attributes p1a, p1b, . . . , p2a, p2b, . . . , p3, p3b, . . .

Thus, in the triangle level, the triangle data set is first characterized in the world coordinate space by the three vertices with texture coordinates as follows:

{[X1,Y1,Z1,1][p1a,p1b, . . . ]},{[X2,Y2,Z2,1][p2a, p2b, . . . ]}, {[X3, Y3, Z3,1][p3a, p3b, . . . ]}

The world coordinate space (three-dimensional space) serves to define objects prior to any geometric transformations. Given this triangle data set in the world coordinate space, the triangle data set is then transformed into viewer coordinate space and clipped to a view volume. Essentially, the triangle first specified in world space is treated with respect to a defined viewpoint. In the viewer space, the eye or viewpoint is the origin for coordinates and the view ray is along the Z-axis. The resulting triangle data set in viewer coordinate space, i.e., the triangle 120' with coordinates in viewer (homogenous) space as shown in FIG. 4B part (b), is described as follows:

{[X1hY1h,Z1h,W1][p1ah,p1bh, . . . ]},{[X2h,Y2h,Z2h, W2][p2ah,p2bh, . . . ]}, {[X3h,Y3h,Z3h,W3][p3ah, p3bh, . . . ]}, where [X1h, Y1h, Z1h], [X2h, Y2h, Z2h], [X3h, Y3h, Z3h], are the respective coordinates in the homogenous space, W1, W2, W3 are the perspective correction parameters, and p1ah, p1bh, . . . , p2ah, p2bh, . . . , p3ah, p3bh, . . . are the attributes in the homogenous space.

A triangle setup phase follows the transformation to viewer coordinate space, in which, three (3) sets of the homogenous coefficients (ai, bi, ci) are derived from the triangle data set in the homogenous coordinate space, where, for example, a1=Y2h*W3−Y3h*W2. More broadly, the coefficients are derived by:

$$a_i = Yjh \cdot Wk - Ykh \cdot Wj;$$

$$b_i = Xjh \cdot Wk - Xkh \cdot Wj; \text{ and}$$

$$c_i = Xjh \cdot Ykh - Xkh \cdot Yjh,$$

and where i, j & k=1, 2 & 3.

Concurrently, as is preferred, the triangle viewer coordinate data set is projected to the screen coordinate space, to produce {[X1s, Y1s], [X2s, Y2s], . . . [X3s, Y3s]}.

Screen coordinate space involves further transformations where the object geometry in screen coordinate system is projected and transformed to give depth to the displayed object. Accordingly, as shown in FIG. 4A, the triangle data set is then rasterized to produce the blank pixel data. Rasterization dissects primitives such as triangles into pixels and in the process it performs Z-buffering (to capture depth, Z-axis, data) and other pixel-level functions. Thus, for N pixels covered by the triangle (120" as shown in FIG. 4B, part (c)), the blank pixel data from the rasterization step is described by the N coordinates in the screen space as follows:

{[X1s, Y1s], [X2s, Y2s], . . . [XNs, YNs]}.

As further shown in FIG. 4B, a pixel setup phase follows. Namely, for each pixel, P, covered by the triangle, homogenous space coefficients d1, d2, d3 and barycentric coefficients, α, β, and γ, are calculated in the homogeneous space. From this we arrive at the homogeneous barycentric data for the pixels affected by the triangle. The pixel setup phase uses the data from the triangle level setup phase and the blank pixel data from the rasterization step.

Lastly, in the interpolation phase, the homogeneous coordinates and attributes for each pixel are linearly interpolated using the barycentric coordinates previously calculated. This includes linear interpolation of the Z-coordinate in homogenous space, Zh, the perspective correction parameter, W, and the attributes, Pah, Pbh, . . . in the homogenous space. For each pixel, the resulting Z-coordinate, Z_pix, is:

$$Z\_pix = \alpha \cdot Z1h + \beta \cdot Z2h + \gamma \cdot Z3h;$$

The resulting perspective correction parameter, W_pix, is:

$$W\_pix = \alpha \cdot W1 + \beta \cdot W2 + \gamma \cdot W3; \text{ and}$$

for each of its attributes, after interpolation the resulting attributes, Phi, for each pixel, is $$Phi\_pix = \alpha P1hi + \beta \cdot P2hi + \gamma \cdot P3hi.$$

After the linear interpolation, the resulting pixels data with depth is described as:

{[X1s,Y1s,Z1s,W1h][p1a,p1b, . . . ]},{[X2s,Y2s,Z2s,W2h][p2a,p2b, . . . ]}, {[X3s,Y3s,Z3h,W3h][p3a,p3b, . . . ]}, . . .

More particularly, together, FIGS. 4C & 4D show triangle setup and pixel processing formulae in the various steps accordance with the present invention. As shown, for each pixel of the triangle, we can express the pixel's coordinates from three vertices using the barycentric coefficients, as typically employed in texture application techniques. A barycentric coordinate system is defined, for example, in OpenGL™ from Silicon Graphics, Inc. Given a triangle with three vertices, P1 (x1, y1, z1), P2(x2, y2, z2), and P3(x3, y3, z3), a point P (x, y, z) located somewhere in the plane of the triangle may be defined in terms of the three vertices using $P = \alpha P1 + \beta P2 + \gamma P3$, where $\alpha$, $\beta$, and $\gamma$ are the barycentric coefficients of the point P. Consequently, the point P can be defined as follows:

$$X = \alpha x1 + \beta x2 + \gamma x3, \text{ and}$$

$$Y = \alpha y1 + \beta y2 + \gamma y3.$$

It is noted that the point P is defined by a unique set of barycentric coordinates and further that the coordinates satisfy the requirement that $\alpha + \beta + \gamma = 1$.

Thus, based on the barycentric coefficients, the coordinates, X,Y, of each pixel affected by the triangle can be derived. This means that the point P can be calculated as a linear combination of the vertices (P1, P2, P3). As the barycentric coefficients are applicable to interpolation of any attribute of the pixel, including Z-coordinate, color, UV coordinates, etc., once they are calculated the attributes can be calculated as well. In particular, $\alpha$, $\beta$, and $\gamma$ are calculated as shown in Equation (1) of FIG. 4C. And, once a determination of the barycentric coefficients is made they can be used to interpolate the entire polygon (triangle). Furthermore, with the ability to locate each pixel point (P) using the barycentric coordinates in the homogenous space, the polygon can be shaded or texture mapped by specifying the locations of the points.

When the three triangle vertices are enumerated with i=1, 2, 3, j=i mod3+1, and k=j mode3+1, and the substitutions into Equation (1) of $a_i = y_j - y_k$, $b_i = x_k - x_j$, $c_i = x_j * y_k - x_k * y_j$, are made, as shown in Equation (2), the barycentric coefficients can be restated as shown in Equation (3).

As shown in Equation (4), w, the perspective correction parameter of the point P, is a function of the barycentric coordinates, $\alpha$, $\beta$, and $\gamma$, and the perspective correction parameters, $w_1$, $w_2$, $w_3$, of the three vertices. It is noted that the perspective correction parameter, w, is preserved in order to preserve the information on the distance to the viewpoint. However, before re-calculation of the barycentric coordinates in the homogenous (viewpoint) space can be done, the vertices, $x_i, y_i$, are converted to coordinates in the homogenous space, $\tilde{x}_i, \tilde{y}_i$, using the corresponding parameters, $w_i$. The coordinates $(\tilde{x}, \tilde{y})$ of P in the homogenous space are then derived using w.

Then, a number of calculations are performed to allow for the calculation of the barycentric coordinates in the homogenous space. These include 1) calculating three sets of homogenous space coefficients, $a_i$, $b_i$, $c_i$, (per triangle) which are shared for every pixel affected by the triangle, 2) converting these to coefficients in the homogenous space, $\tilde{a}_i$, $\tilde{b}_i, \tilde{c}_i$, using the perspective correction parameters, $w_i$, and 3) calculating $d_i$ (per pixel), as shown in Equation (6) of FIG. 4D. Once the three values, $d_1$, $d_2$, $d_3$, are determined, the barycentric coefficients (for P) in the homogenous space, $\tilde{\alpha}$, $\tilde{\beta}$, and $\tilde{\gamma}$, can be calculated (for P) to complete the triangle interpolation in the homogenous space, as shown in Equation (5). Through the interpolation process for each point, P, of a pixel affected by the triangle, the barycentric coefficients calculated in the homogenous space are used to obtain the true value (avoiding a division by 1/W). Thus, the triangular object is simulated by pixels with proper depth attributes.

Figure 1:
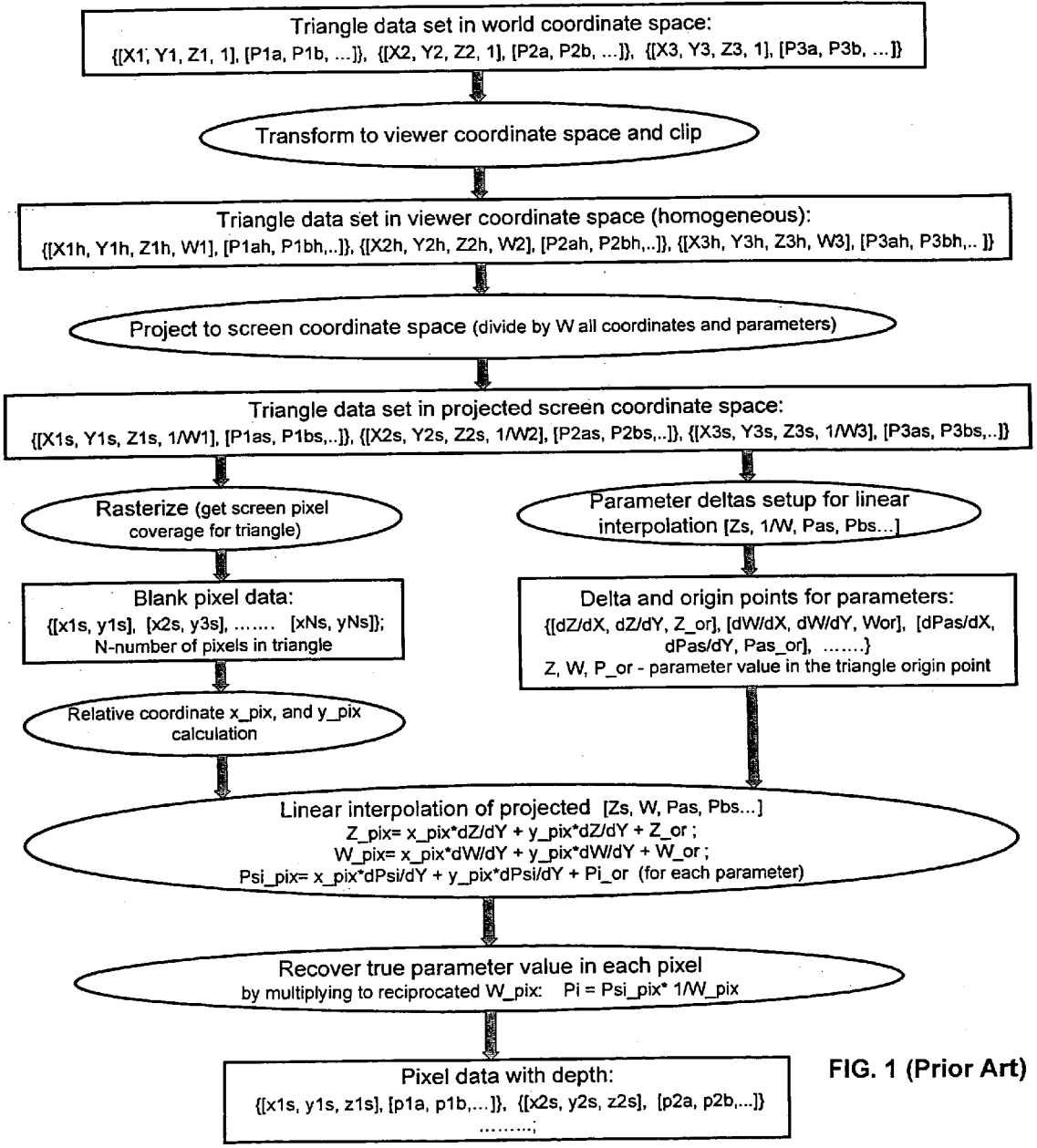
FIG. 1 shows a prior art triangle rasterization and interpolation method using screen Cartesian coordinates.
Figure 2:
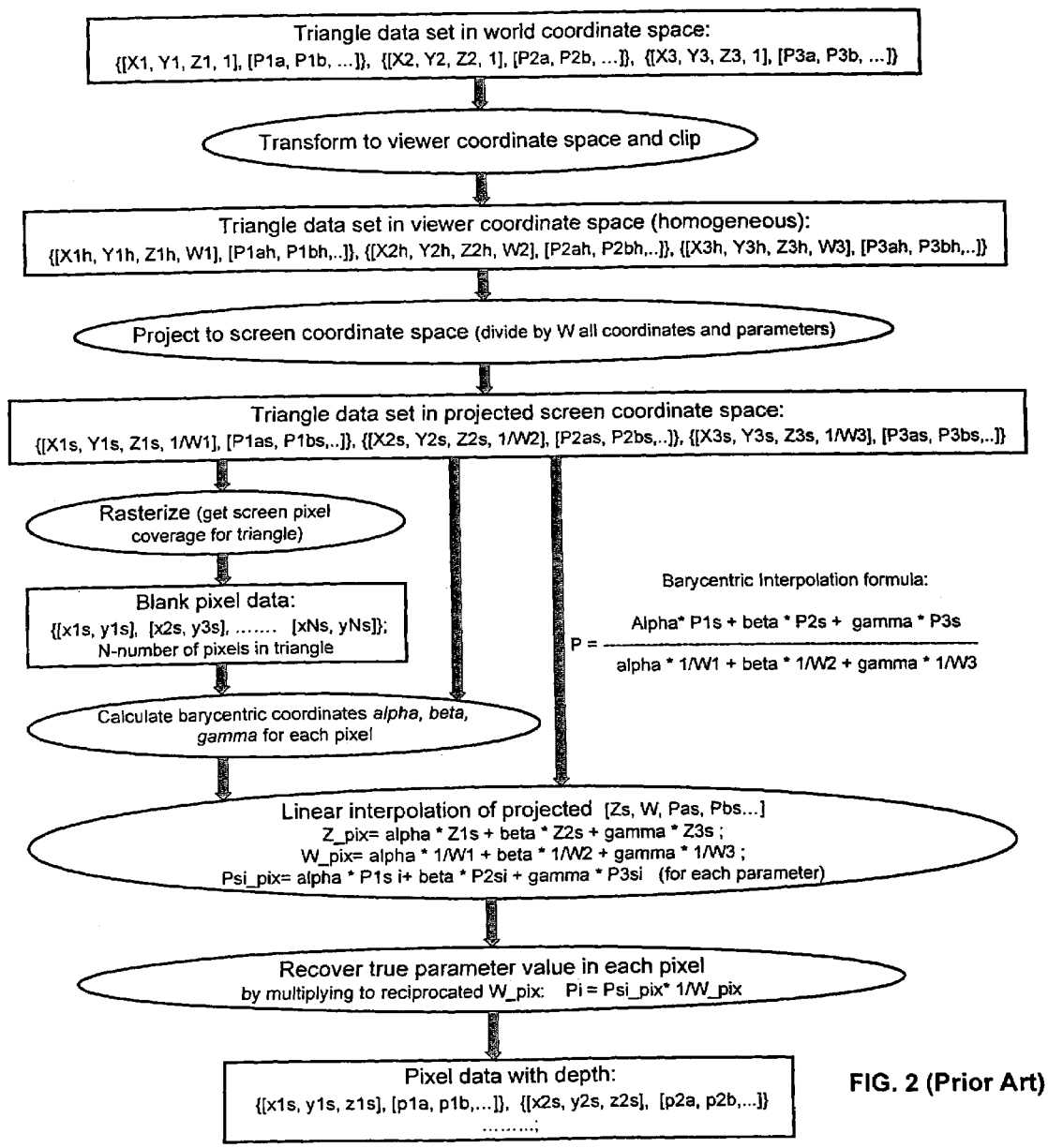
FIG. 2 shows a prior art triangle rasterization interpolation method using screen barycentric coordinates.
Figure 3:
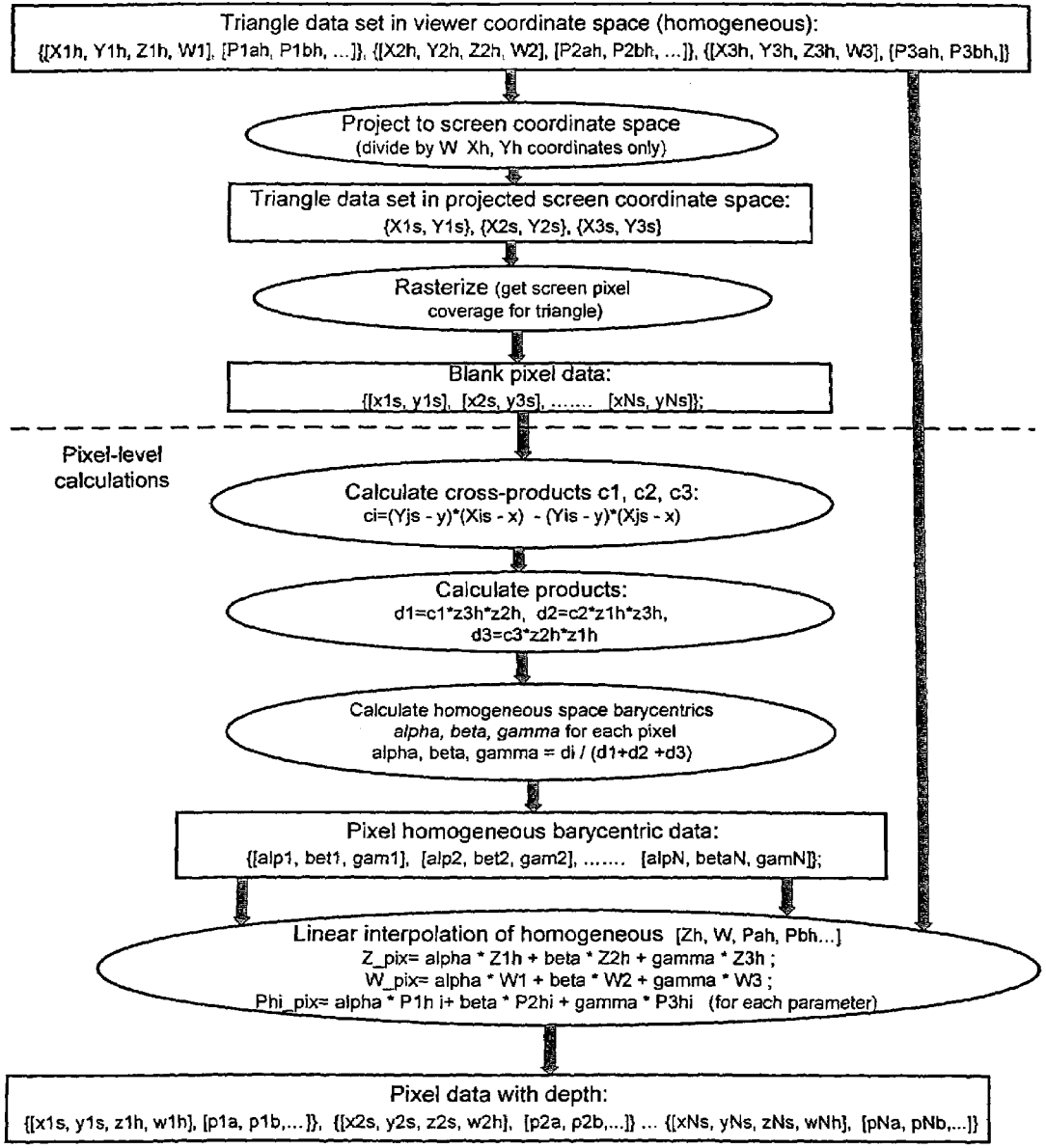
FIG. 3 shows another prior art triangle interpolation method using homogeneous barycentric coordinates.
Figure 5A:
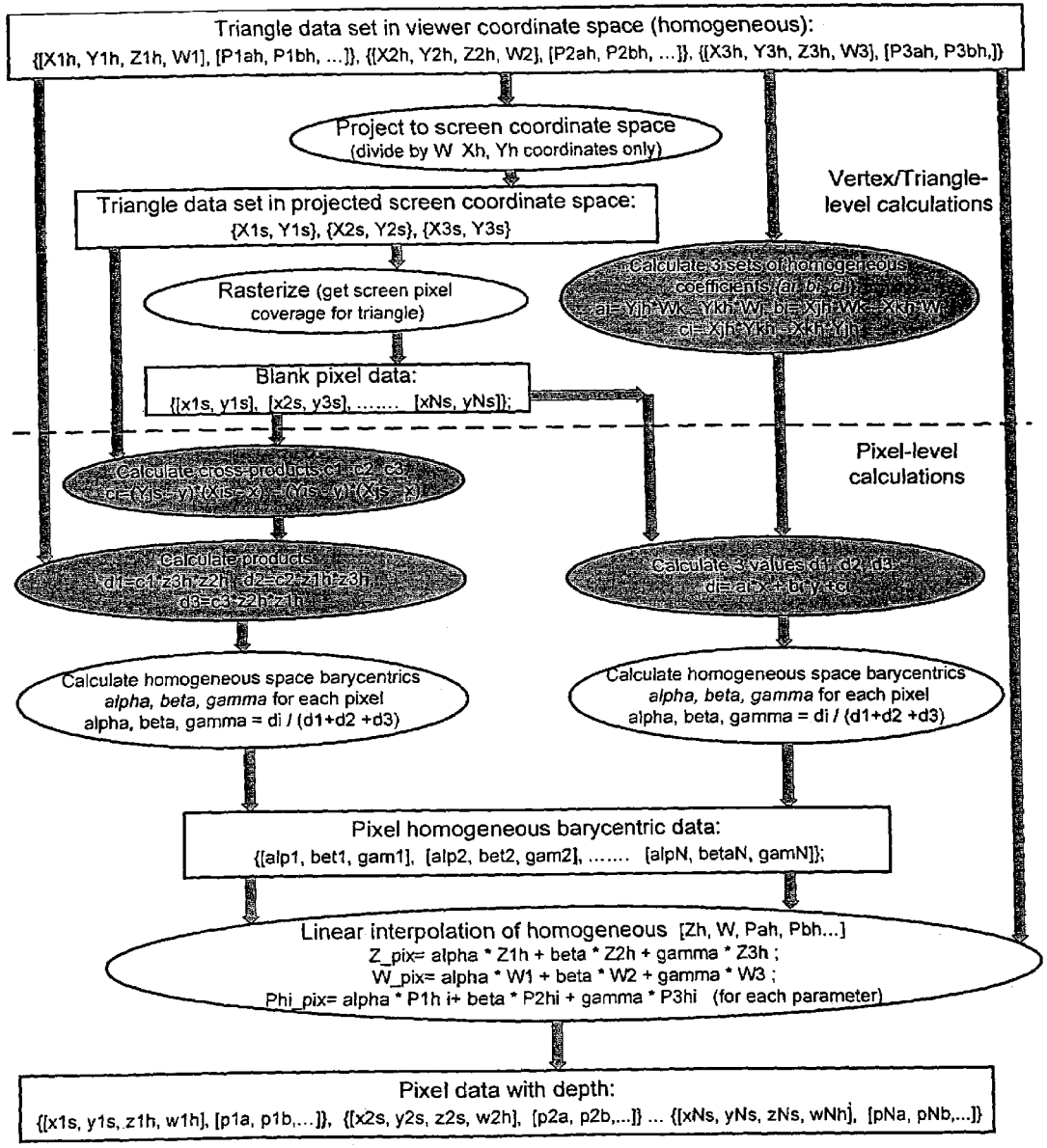
FIG. 5A shows a comparison of the steps of FIG. 4 with FIG. 3.

FIG. 5A shows a comparison of the steps of FIG. 4A with FIG. 3. The shaded blocks on the left side of the diagram indicate steps in FIG. 3 that are different and the shaded blocks on the right side of the diagrams indicate steps in FIG. 4A that are different. Unshaded blocks in FIG. 5A are steps common to both FIGS. 3 and 4A. FIG. 5B shows a table that tabulates the differences in the number of operations between the steps of FIG. 4A and FIG. 3.

The difference between the approach of the present invention and the method of FIG. 3 is that, in the present invention, the homogeneous barycentric calculation is split into two levels: (a) a triangle level setup and (b) a pixel level setup. This reduces the number of calculations for multi-pixel triangles. Another difference is that the present invention uses fewer arithmetic operations compared to prior art implementations and, thus, has better performance compared to triangle interpolation in screen space and later perspective correction. Additionally, the method of the present invention avoids parameter projection for interpolation in screen space and further perspective correction computations to recover true value in the viewpoint space.

Yet another difference is that the present invention provides very accurate and fast interpolation of triangles using the same ALUs for both triangle and pixel processing, with arbitrary interleaving of triangle and pixel processing instructions. The hardware SIMD unit used for interpolation is scalable to increase the performance of barycentric interpolation. The hardware unit is very flexible in terms of accuracy and performance, and it can be used for other graphics processing tasks to improve overall performance balance. Indeed, the programmable SIMD scalar unit, used for the algorithm implementation, can be used for further pixel processing according to Microsoft Dx9,10 and OpenGL API requirements for programmable graphics machines. Also, the triangle interpolation method, in accordance with the present invention, is more suitable for implementation on programmable graphics processing unit and gives an efficiency close to the efficiency of a dedicated hardware implementation.

Figure 6A:
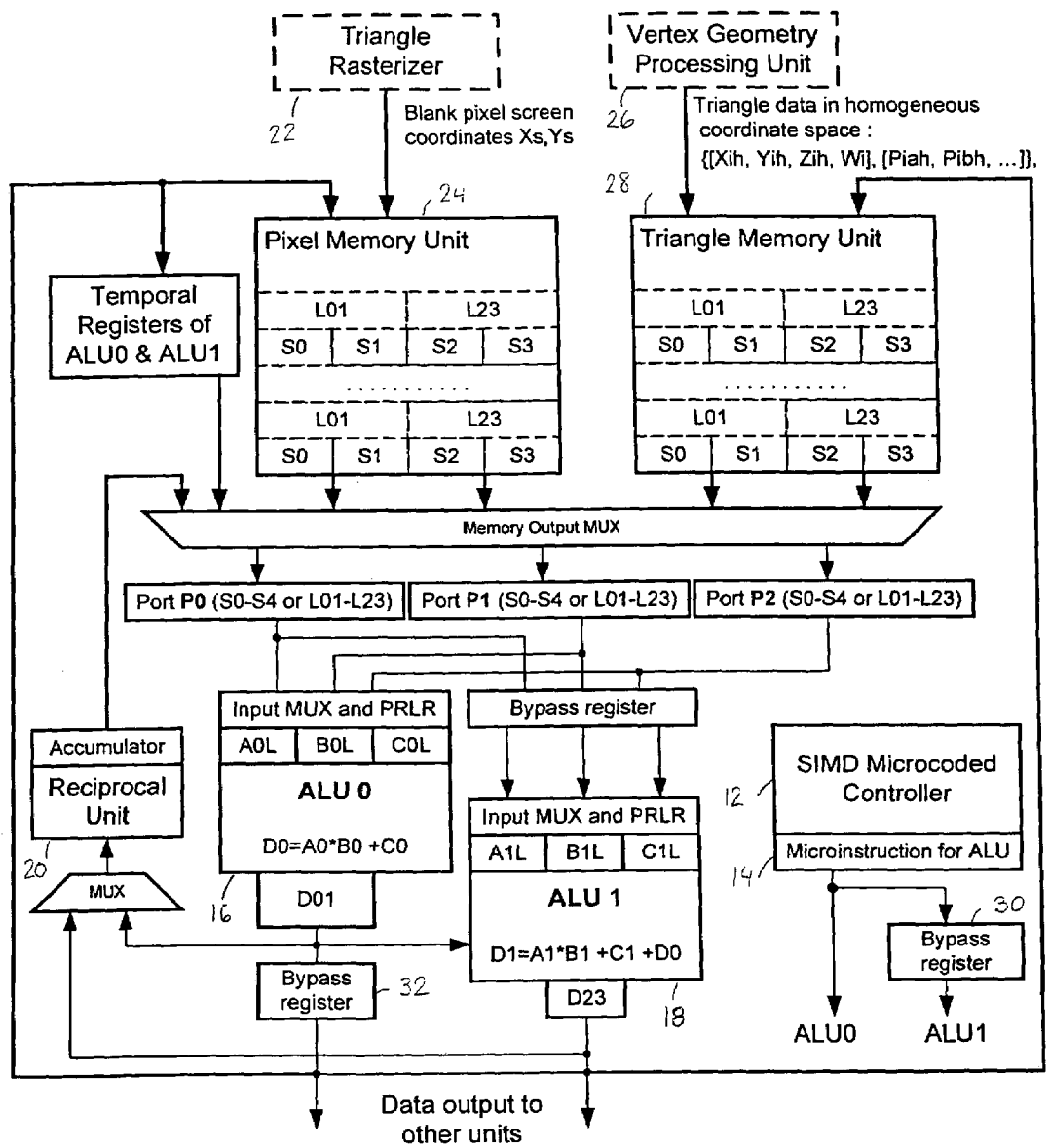
FIG. 6A shows a programmable unit for triangle barycentric interpolation in long data processing mode.

An apparatus of the present invention is implemented in one universal programmable unit replacing separate depth, color and texture address interpolators. To illustrate, FIG. 6A is a diagram of a programmable hardware unit 10 in accordance with an embodiment of the present invention. The universal hardware unit 10 includes a programmable single instruction multiple data (SIMD) scalar unit 12 for executing the various interpolation operations. Notably, the triangle interpolation algorithm of the present invention can be executed on the programmable SIMD unit 12 with efficiency that is close to the efficiency of dedicated hardware. In fact, all interpolation operations are executed in floating point arithmetic with the highest possible accuracy. To increase the performance of the hardware unit 10, the SIMD 12 can be replicated.

This hardware unit 10 is implemented as a two-ALUs unit where the scalar ALUs, 16 and 18, are implemented with shifted processing cycles. The cycle shifting is accomplished with the bypass registers 30 and 32. The unit 10 can process, in each clock, one triangle or a number of pixels (e.g., 2–4 pixels) depending on the required accuracy, and with the arbitrary interleaving of triangle and pixel processing instructions. The Reciprocal unit 20, is used for processing the division calculations (as described with reference to the method of FIG. 4A and FIGS. 4C & 4D). The SIMD Processing algorithm is programmed in microcode memory 14 and the instruction set is optimized to reduce the number of instructions.

Also included in the hardware unit 10, are the triangle rasterizer 22, and the blank pixel screen coordinates data it produces are stored in pixel memory 24. The vertex geometry processing unit 26, produces data of the triangle coordinates in the homogenous space and this data is stored in the triangle memory unit 28.

FIG. 6B sets forth the SIMD ALU instruction set. Two types of data, long floating point (FP) and short FP, can be processed in separate or mixed mode for reducing the length of the program. One type of the instruction used to perform the required calculations in Equation (6) in FIG. 4D is the 'Cross Mode Long' instruction, XPRDL D,D", P0, P1 for producing a cross product. For example, the instruction "XPRDL A0, V1.yw, V2.yw" is executed to calculate the homogenous coefficient a1. Then, for calculating the value di, one of the instructions is the 'Folded Long' instruction, FSUBL D, P0", P2" which produces cross products.

To see how these and other instructions are used, an example program is set forth below. In this program, the instruction XPRDL is used a number of times to perform the calculations required by Equation (6) for i=0, 1, and 2 (i.e., for a0, a1, a2, b0, b1, b2, c0, c1, c2). Note that the index 'i' in this program equals 0, 1, 2 rather than i=1, 2, 3, as described above, but the results are not affected by this. For pixel barycentric coefficients calculations ($\alpha,\beta,\gamma$), as required by Equation (5), the instructions include MOV, FBL ('Folded Blend Mode'), FWD, FSUBL ("Folded Long"), etc. For pixel attribute interpolation as shown in FIG. 4A, the instructions include MULL (multiply long) and FSUBL.

More specifically, below is the listing of the required calculations and their implementation in the instruction set of the SIMD ALU, for the (i) triangle setup and (ii) pixel processing, and (iii) pixel attribute interpolation.

//Barycentric triangle setup:
//The calculations as required by Equation (6) for index i=0:

$tri\_a[0]=v[1].y*v[2].w-v[2].y*v[1].w$

$tri\_b[0]=v[2].x*v[1].w-v[1].x*v[2].w$

$tri\_c[0]=v[1].x*v[2].y-v[2].x*v[1].y$

//
//The calculations as required by Equation (6) for index i=1:

$tri\_a[1]=v[2].y*v[0].w-v[0].y*v[2].w$

$tri\_b[1]=v[0].x*v[2].w-v[2].x*v[0].w$

$tri\_c[1]=v[2].x*v[0].y-v[0].x*v[2].y$

//
//The calculations as required by Equation (6) for index i=2:

$tri\_a[2]=v[0].y*v[1].w-v[1].y*v[0].w$

$tri\_b[2]=v[1].x*v[0].w-v[0].x*v[1].w$

$tri\_c[2]=v[0].x*v[1].y-v[1].x*v[0].y$

To implement the forgoing required calculations, the following instructions are executed (with 9 instructions, for SIMD 4 bits (nibble) mode):

//
//The instructions for executing calculations as required by Equation (6) for index i=0:

XPRDL A0, V1.yw, V2.yw

XPRDL B0, -V1.xw, V2.xw

XPRDL C0, V1.xy, V2.xy

//
//The instructions for executing calculations as required by Equation (6) for index i=1:

XPRDL A1, V2.yw, V0.yw

XPRDL B1, -V2.xw, V0.xw

XPRDL C1, V2.xy, V0.xy

//
//The instructions for executing calculations as required by Equation (6) for index i=2:

XPRDL A2, V0.yw, V1.yw

XPRDL B2, -V0.xw, V1.xw

XPRDL C2, V0.xy, V1.xy

//Pixel barycentric data processing, as required by Equation (5):
//Barycentric parameters calculation for each pixel, with calculations of di for i=0, 1, 2:

$pix\_d[0]=x*tri\_a[0]+y*tri\_b[0]+tri\_c[0]$

$pix\_d[1]=x*tri\_a[1]+y*tri\_b[1]+tri\_c[1]$

$pix\_d[2]=x*tri\_a[2]+y*tri\_b[2]+tri\_c[2]$

$pix\_d[3]=1/(pix\_d[0]+pix\_d[1]+pix\;d[2])$

//
//Pixel barycentric coefficients ($\alpha,\beta,\gamma$) calculation based on di:

$alpha=pix\_d[0]*pix\_d[3]$

$beta=pix\_d[1]*pix\_d[3]$ gamma=1-alpha-beta

To implement the forgoing required calculations, the following instructions are executed (with 7 instructions):

//
MOV pr, xy
FBLDL D0, pr, AB0, C0
FBLMP NULL, D1, pr, AB1, C1, AB2, C2
FWD RCPL
MULL ALPHA, D0, ACC
MULL BETA, D1, ACC
FSUBL GAMMA, HW_ONE, ALPHA, 0, BETA
//Pixel attribute interpolation:
//Required calculations:

$pix\_att=v\_att0*alpha+v\_att1*beta+v\_att2*gamma$

Z interpolation mode-long operands

To implement the forgoing required calculations, the following instructions are executed (with 2 instructions, for SIMD 8 bits (byte) mode):
//
  MULL R0, ALPHA, V_ATT0
  FBLDL PIX_ATT, BETA, V_ATT1, R0, GAMMA, V_ATT2
//Other attribute mode—short parameter operands (with 3 instructions, for SIMD 16 bits (word) mode):
//
  MULM r0, v_att0, ALPHA
  MADM r0, v_att1, BETA, r0
  MADM pix_att, v_att2, GAMMA, r0
//

Figure 7:
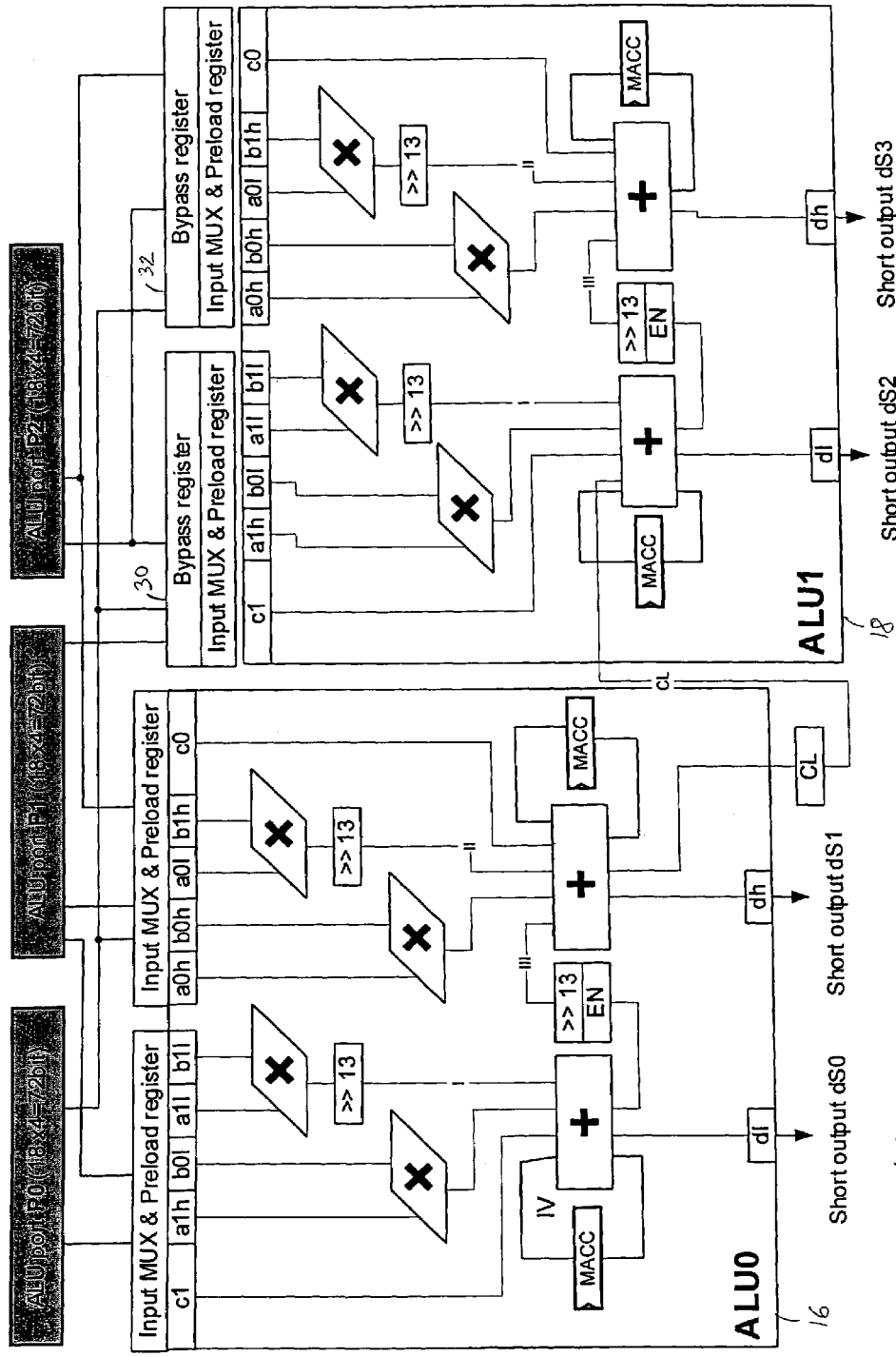
FIG. 7 shows an ALU structure for the short data processing mode of the present invention.

Finally, FIG. 7 shows a SIMD-ALU structure for the short data processing mode of the method, in accordance with an embodiment of the present invention. As indicated before, this unit is implemented as two scalar ALUs, $ALU_0$ 16 and $ALU_1$ 18. As shown, both $ALU_0$ 16 and $ALU_1$ 18 process the aforementioned coefficients, c1, a1h, b01, a11, b11, a0h, b0h, a01, b1h and c0, with multiplications, shifting and addition operations, The $ALU_0$ 16 and $ALU_1$ 18 are operative to handle 4 pixels in cycle-shifted operations (each 18×4=72 bits) with the bypass registers 30, 32.

Thus, the method and interpolation algorithm of the present invention are implemented in floating point arithmetic units with high efficiency and accuracy; a performance improvement is made in triangle interpolation for triangles with size more than 1 pixels compared to prior art methods; and simplification is made of pixel level interpolation hardware by splitting the homogeneous barycentric coordinate calculation to triangle level and pixel level.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for obtaining an attribute within a triangle, comprising:
    obtaining the vertices of a triangle, each vertex being represented by a set of coordinates in a world coordinate space and having at least one attribute;
    for each vertex, transforming the world space coordinates and the attribute of the vertex to coordinates and an attribute in viewer space to create viewer space coordinates and a viewer space attribute, said viewer space coordinates being homogeneous coordinates, computing a set of homogeneous coefficients of the triangle based on the viewer space vertex homogeneous coordinates, said homogeneous triangle coefficients including perspective data, and projecting the viewer space coordinates of the vertex to coordinates in 2D screen space;
    determining, in the 2D screen space, pixels that are affected by the triangle based on the 2D screen space coordinates; and
    for each pixel affected by the triangle, computing, based on the homogeneous triangle coefficients, a set of barycentric coefficients in viewer space, and performing a linear interpolation based on the set of viewer space barycentric coefficients and the viewer space attributes of the triangle vertices to obtain the attribute of the pixel affected by the triangle.

2. A method as in claim 1, wherein, for each vertex, the coordinates and attribute in viewer space are represented respectively by [Xih, Yih, Zih, Wi] and, [Piah . . . Pinh], where 'i' is an index associated with the vertex and i=1, 2, 3, and where Wi is a homogeneous component representing a perspective correction parameter.

3. A method as in claim 1, wherein determining the pixels affected by the triangle includes rasterizing the triangle.

4. A method as in claim 3, wherein the rasterization provides blank pixel data associated with the pixels affected by the triangle.

5. A method as in claim 1, wherein determining the pixels affected by the triangle includes providing blank pixel data associated with the affected pixels.

6. A method as in claim 5, wherein for N pixels affected by the triangle the blank pixel data includes N screen space coordinates $\{[X_1s, Y_1s], [X_2s, Y_2s], \ldots [X_Ns, Y_Ns]\}$.

7. A method as in claim 1, wherein the depth and perspective data of each of the pixels affected by the triangle is represented by parameters in the homogeneous space.

8. A method as in claim 1, wherein the attribute obtained in the homogeneous space is depth.

9. A method as in claim 1, wherein the attribute obtained in the homogeneous space is color.

10. A method as in claim 1, wherein the attribute obtained in the homogeneous space is texture.

11. A method as in claim 1, wherein the attribute obtained in the homogeneous space is shading.

12. A system for obtaining an attribute within a triangle in homogeneous space, comprising:
    means for obtaining the vertices of a triangle, each vertex being represented by a set of coordinates in a world coordinate space and having at least one attribute;
    means for transforming the world space coordinates and the attribute of each vertex to coordinates and an attribute in viewer space to create viewer space coordinates and a viewer space attribute, said viewer space coordinates being homogeneous coordinates;
    means for computing a set of homogeneous coefficients of the triangle based on the viewer space vertex coordinates, said homogeneous triangle coefficients including perspective data;
    means for projecting the viewer space homogeneous coordinates of the vertex to coordinates in 2D screen space;
    means for determining, in the 2D screen space, pixels that are affected by the triangle based on the 2D screen space coordinates; and
    means for computing, based on the homogeneous triangle coefficients, a set of barycentric coefficients in viewer space for each pixel affected; and
    means for performing a linear interpolation based on the set of viewer space barycentric coefficients and the viewer space attributes of the triangle vertices to obtain the attribute value of each pixel affected by the triangle.

13. A method as in claim 12, wherein, for each vertex, the coordinates and attribute in viewer space are represented respectively by [Xih, Yih, Zih, Wi] and [Piah . . . Pinh], where 'i' is an index associated with the vertex and i=1, 2, 3, and where Wi is a perspective correction parameter.

14. A system as in claim 12, wherein means for determining the pixels affected by the triangle includes means for rasterizing the triangle.

15. A system as in claim 14, wherein the rasterization means provides blank pixel data associated with the pixels affected by the triangle.

16. A system as in claim 12, wherein the means for determining the pixels affected by the triangle includes means for providing blank pixel data associated to these pixels.

17. A system as in claim 16, wherein for N pixels affected by the triangle the blank pixel data includes N screen space coordinates $\{[X_1s, Y_1s], [X_2s, Y_2s], \ldots [X_Ns, Y_Ns]\}$.

18. A method as in claim 12, wherein the depth and perspective data of each of the pixels affected by the triangle is represented parameters in the homogeneous space.

19. A method as in claim 12, wherein the attribute obtained in the homogeneous space is depth.

20. A method as in claim 12, wherein the attribute obtained in the homogeneous space is color.

21. A method as in claim 12, wherein the attribute obtained in the homogeneous space is texture.

22. A method as in claim 12, wherein the attribute obtained in the homogeneous space is shading.

23. A programmable device for obtaining an attribute in homogeneous space, comprising:
   a computing unit;
   a processor, and
   a memory with program instructions, the processor being operatively connected with the memory, and the computing unit, for causing the programmable device to perform the steps of:
   obtaining the vertices of a triangle, each vertex being represented by a set of coordinates in a world coordinate space and having at least one attribute;
   for each vertex, transforming the world space coordinates and the attribute of the vertex to coordinates and an attribute in viewer space to create viewer space coordinates and a viewer space attribute, said viewer space coordinates being homogeneous coordinates, computing a set of homogeneous coefficients of the triangle based on the viewer space homogeneous vertex coordinates, said homogeneous triangle coefficients including perspective data, and projecting the viewer space coordinates of the vertex to coordinates in 2D screen space;
   determining, in the 2D screen space, pixels that are affected by the triangle based on the 2D screen space coordinates; and
   for each pixel affected by the triangle, computing, based on the homogeneous coefficients, a set of barycentric coefficients in viewer space, and performing a linear interpolation based on the set of viewer space barycentric coefficients and the viewer space attributes of the triangle vertices to obtain the attribute of the pixel affected by the triangle.

24. A programmable device as in claim 23, wherein the computing unit includes
   a unit having two ALUs (arithmetic logic units); and
   a reciprocal unit.

25. A programmable device as in claim 23, wherein the processor includes at least one programmable single instruction multiple data (SIMD) scalar unit.

26. A programmable device as in claim 23,
   further comprising a bypass register; and
   wherein the computing unit includes two-ALUs configured to operate with shifted processing cycles, using the bypass registers, to interleave triangle and pixel processing instructions.

27. A programmable device as in claim 23, further comprising a triangle rasterizer operative to produce blank pixel screen coordinates for the pixels affected by the triangle.

28. A programmable device as in claim 23, further comprising a vertex geometry processing unit operative to provide the viewer space coordinates.

29. A programmable device as in claim 23, operative to perform operations in long floating point (FP) mode, short FP mode, and mixed long-short FP mode.

30. A programmable device as in claim 23 operative to perform depth, color, shading and texture interpolations.

31. A method for obtaining an attribute within a triangle, comprising:
   obtaining the vertices of a triangle, each vertex being represented by a set of coordinates in a world coordinate space and having at least one attribute;
   for each vertex, transforming the world space coordinates and the attribute of the vertex to coordinates and an attribute in viewer space to create viewer space coordinates and a viewer space attribute, said viewer space coordinates being homogeneous coordinates, computing a set of homogeneous coefficients of the triangle based on the viewer space homogeneous vertex coordinates, said homogeneous triangle coefficients including perspective data, and projecting the viewer space coordinates of the vertex to coordinates in 2D screen space;
   determining, in the 2D screen space, pixels that are affected by the triangle based on the 2D screen space coordinates; and
   for each pixel affected by the triangle, computing, based on the homogeneous triangle coefficients, a set of barycentric coefficients in viewer space, and performing a linear interpolation based on the set of viewer space barycentric coefficients and the viewer space attributes of the triangle vertices to obtain the attribute of the pixel affected by the triangle;
   wherein the homogeneous coefficients of the triangle are $\tilde{a}_i, \tilde{b}_i, \tilde{c}_i$, and based on the viewer space coordinates they are calculated in $\tilde{a}_i = Yjh \cdot Wk - Ykh \cdot Wj$, $\tilde{b}_i = Xjh \cdot Wk - Xkh \cdot Wj$, and $\tilde{c}_i = Xjh \cdot Ykh - Xkh \cdot Yjh$, where $j = i \bmod 3 + 1$, and $k = j \bmod[e]3 + 1$, and Wi and Wk are homogeneous components representing perspective correction parameters, where $i = 1, 2, 3$.

32. A method for obtaining an attribute within a triangle, comprising:
   obtaining the vertices of a triangle, each vertex being represented by a set of coordinates in a world coordinate space and having at least one attribute;
   for each vertex, transforming the world space coordinates and the attribute of the vertex to coordinates and an attribute in viewer space to create viewer space coordinates and a viewer space attribute, said viewer space coordinates being homogeneous coordinates, computing a set of homogeneous coefficients of the triangle based on the viewer space homogeneous vertex coordinates, said homogeneous triangle coefficients including perspective data, and projecting the viewer space coordinates of the vertex to coordinates in 2D screen space;
   determining, in the 2D screen space, pixels that are affected by the triangle based on the 2D screen space coordinates; and
   for each pixel affected by the triangle, computing, based on the homogeneous triangle coefficients, a set of barycentric coefficients in viewer space, and performing a linear interpolation based on the set of viewer space barycentric coefficients and the viewer space attributes of the triangle vertices to obtain the attribute of the pixel affected by the triangle;
   wherein the homogeneous coefficients of the triangle are $\tilde{a}_i, \tilde{b}_i, \tilde{c}_i$, and based on the viewer space vertex coordinates they are calculated in $\tilde{a}_i = Yjh \cdot Wk - Ykh \; Wj$, $\check{b}_i$=Xjh.Wk−Xkh.Wj, and čhd i=Xjh.Ykh−Xkh.Yjh, where j=i mod3+1, and k=j mod[e]3+1, and Wi and Wk are homogeneous components representing perspective correction parameters, where i=1, 2, 3;

wherein α, β, γ, represent the set of barycentric coefficients, d1, d2, d3, represent intermediate values, and the computations, for each pixel, of the set of barycentric coefficients, include calculating d1, d2 and d3, using the homogeneous triangle coefficients, $\tilde{a}_i, \tilde{b}_i, \tilde{c}_i$, in $d_i=(\tilde{a}_i.X+\tilde{b}_i.Y+\tilde{c}_i)$, calculating the homogeneous space barycentric coefficients, α, β, γ, using the intermediate values d1, d2, d3, in.

$$\alpha = \frac{d_1}{d_1+d_2+d_3}, \beta = \frac{d_2}{d_1+d_2+d_3}, \text{ and } \gamma = \frac{d_3}{d_1+d_2+d_3}.$$

33. A method for obtaining an attribute within a triangle, comprising:

obtaining the vertices of a triangle, each vertex being represented by a set of coordinates in a world coordinate space and having at least one attribute;

for each vertex, transforming the world space coordinates and the attribute of the vertex to coordinates and an attribute in viewer space to create viewer space coordinates and a viewer space attribute, said viewer space coordinates being homogeneous coordinates, computing a set of homogeneous coefficients of the triangle based on the viewer space homogeneous vertex coordinates, said homogeneous triangle coefficients including perspective data, and projecting the viewer space coordinates of the vertex to coordinates in 2D screen space;

determining, in the 2D screen space, pixels that are by the triangle based on the 2D screen space coordinates; and for each pixel affected by the triangle, computing, based on the homogeneous triangle coefficients, a set of barycentric coefficients in viewer space, and performing a linear interpolation based on the set of viewer space barycentric coefficients and the viewer space attributes of the triangle vertices to obtain the attribute of the pixel affected by the triangle;

wherein the homogeneous coefficients of the triangle are $\tilde{a}_i, \tilde{b}_i, \tilde{c}_i$, and based on the viewer space coordinates they are calculated in $\tilde{a}_i$=Yjh.Wk−Ykh.Wj, $\tilde{b}_i$=Xjh.Wk−Xkh.Wj, and $\tilde{c}_i$=XJh.Ykh−Xkh.Yjh, where j=i mod3+1, and k=j mod[e]3+1, and Wi and Wk are homogeneous components representing perspective correction parameters, where i=1, 2, 3;

wherein α, β, γ, represent the set of barycentric d1, d2, d3, represent intermediate values, and the computations, for each pixel, of the set of barycentric coefficients, include calculating d1, d2 and d3, using the homogeneous coefficients, $\tilde{a}_i, \tilde{b}_i, \tilde{c}_i$, in $d_i=(\tilde{a}_i.X+\tilde{b}_i.Y+\tilde{c}_i)$, and calculating the homogeneous space barycentric coefficients, α, β, γ, using the intermediate values d1, d2, d3, in $$\alpha = \frac{d_1}{d_1+d_2+d_3},$$

$$\beta = \frac{d_2}{d_1+d_2+d_3}, \text{ and}$$

$$\gamma = \frac{d_3}{d_1+d_2+d_3}$$

wherein the linear interpolation, for each pixel, includes calculation of Z_pix, a Z-coordinate in homogeneous space, W_pix, a perspective correction parameter per pixel and attributes of the pixel in the homogeneous space Phi pix, with the respective calculations being Z_pix=α.Z1h+β.Z2h+γ.Z3h, $W_{\_pix=\alpha.w}$1+β.W2+γ.W3h, and Phi_pix=α.P1hi+γ.P2hi+γP3hi.

34. A system for obtaining an attribute within a triangle in homogeneous space, comprising:

means for obtaining the vertices of a triangle, each vertex being represented by a set of coordinates in a world coordinate space and having at least one attribute;

means for transforming the world space coordinates and the attribute of each vertex to coordinates and an attribute in viewer space to create viewer space coordinates and a viewer space attribute, said viewer space coordinates being homogeneous coordinates;

means for computing a set of homogeneous coefficients of the triangle based on the viewer space vertex coordinates, said homogeneous triangle coefficients including perspective data;

means for projecting the viewer space homogeneous coordinates of the vertex to coordinates in 2D screen space;

means for determining, in the 2D screen space, pixels that are affected by the triangle based on the 2D screen space coordinates;

means for computing, based on the homogeneous triangle coefficients, a set of barycentric coefficients in viewer space for each pixel affected; and means for performing a linear interpolation based on the set of viewer space barycentric coefficients and the viewer space attributes of the vertices to obtain the attribute of each pixel affected by the triangle;

wherein the homogeneous coefficients of the triangle are $\tilde{a}_i, \tilde{b}_i, \tilde{c}_i$, and based on the viewer space coordinates they are calculated in $\tilde{a}_i$=Yjh.Wk−Ykh.Wj, $\tilde{b}_i$=Xjh.Wk−Xkh.Wj, and $\tilde{c}_i$=Xjh.Ykh−Xkh.Yjh, where j=i mod3+1, and k=j mod[e]3+1, and Wi and Wk are homogeneous components representing perspective correction parameters, where i=1, 2, 3.

35. A method for obtaining an attribute within a triangle, comprising:

means for obtaining the vertices of a triangle, each vertex being represented by a set of coordinates in a world coordinate space and having at least one attribute;

means for transforming the world space coordinates and the attribute of each vertex to coordinates and an attribute in viewer space to create viewer space coordinates and a viewer space attribute, said viewer space coordinates being homogeneous coordinates;

means for computing a set of homogeneous coefficients of the triangle based on the viewer space vertex coordinates, said homogeneous triangle coefficients including perspective data;

means for projecting the viewer space homogeneous coordinates of the vertex to coordinates in 2D screen space;

means for determining, in the 2D screen space, pixels that are affected by the triangle based on the 2D screen space coordinates;

means for computing, based on the homogeneous triangle coefficients, a set of barycentric coefficients in viewer space for each pixel affected; and means for performing a linear interpolation based on the set of viewer space barycentric coefficients and the viewer space attributes of the vertices to obtain the attribute of each pixel affected by the triangle;

wherein the homogeneous coefficients of the triangle are $\tilde{a}_i$, $\tilde{b}_i$, $\tilde{c}_i$, and based on the viewer space vertex coordinates they are calculated in $\tilde{a}_i$=Yjh.Wk−Ykh.Wj, $\tilde{b}_i$=Xjh.Wk−Xkh.Wj, and $\tilde{c}_i$=Xjh.Ykh−Xkh.Yjh, where j=i mod3+1, and k=j mod[e]3+1, and Wi and Wk are perspective correction parameters, where i=1, 2, 3;

wherein $\alpha$, $\beta$, $\gamma$, represent the set of barycentric coefficients, d1, d2, d3, represent intermediate values, and the computations, for each pixel, of the set of barycentric coefficients, include calculating d1, d2 and d3, using the homogeneous triangle coefficient, $\tilde{a}_i$, $\tilde{b}_i$, $\tilde{c}_i$, in $d_i=(\tilde{a}_i.X+\tilde{b}_i.Y+\tilde{c}_i)$, and calculating the homogeneous space barycentric coefficients, $\alpha$, $\beta$, $\gamma$, using the intermediate values d1, d2, d3, in.

$$\alpha = \frac{d_1}{d_1 + d_2 + d_3}, \beta\frac{d_2}{d_1 + d_2 + d_3}, \text{ and}$$

$$\lambda = \frac{d_3}{d_1 + d_2 + d_3}.$$

36. A method for obtaining an attribute within a triangle, comprising:

means for obtaining the vertices of a triangle, each vertex being represented by a set of coordinates in a world coordinate space and having at least one attribute;

means for transforming the world space coordinates and the attribute of each vertex to coordinates and an attribute in viewer space to create viewer space coordinates and a viewer space attribute, said viewer space coordinates being homogeneous coordinates;

means for computing a set of homogeneous coefficients of the triangle based on the viewer space vertex coordinates, said homogeneous triangle coefficients including perspective data;

means for projecting the viewer space homogeneous coordinates of the vertex to coordinates in 2D screen space;

means for determining, in the 2D screen space, pixels that are affected by the triangle based on the 2D screen space coordinates;

means for computing, based on the homogeneous triangle coefficients, a set of barycentric coefficients in viewer space for each pixel affected; and means for performing a linear interpolation based o the set of viewer space barycentric coefficients and the viewer space attributes of the vertices to obtain the attributes of each pixel affected by the triangle;

wherein the homogeneous coefficients of the triangle are $\tilde{a}_i$, $\tilde{b}_i$, $\tilde{c}_i$, and based on the viewer space coordinates they are calculated in $\tilde{a}_i$=Yjh.Wk−Ykh.Wj, $\tilde{b}_i$=Xjh.Wk−Xkh.Wj, and $\tilde{c}_i$=Xjh.Ykh−Xkh.Yjh, where j=i mod3+1and k=j mod[e]3+1, and Wi and Wk are homogeneous components representing perspective correction parameters, where i=1, 2, 3;

wherein $\alpha$, $\beta$, $\gamma$, represent the set of barycentric coefficients, d1, d2, d3, represent intermediate values, and the computations, for each pixel, of the set of barycentric coefficients, include calculating d1, d2 and d3, using the homogeneous triangle coefficients, $\tilde{a}_i$, $\tilde{b}_i$, $\tilde{c}_i$, in $d_i=(\tilde{a}_i.X+\tilde{b}_i.Y+\tilde{c}_i)$, and calculating the homogeneous space barycentric coefficients, $\alpha$, $\beta$, $\gamma$, using the intermediate values d1, d2, d3, in $$\alpha = \frac{d_1}{d_1 + d_2 + d_3},$$

$$\beta = \frac{d_2}{d_1 + d_2 + d_3}, \text{ and}$$

$$\gamma = \frac{d_3}{d_1 + d_2 + d_3}$$

wherein the linear interpolation, for each pixel, includes calculation of Z_pix, a Z-coordinate in homogeneous space, W_pix, a perspective correction parameter per pixel, and attributes of the pixel in the homogeneous space Phi_pix, with the respective calculations being Z_pix=$\alpha$.Z1h+$\beta$.Z2h+$\gamma$.Z3h, W_pix=$\alpha$.W1+$\beta$.W2+$\gamma$W3h, and Phi_pix=$\alpha$.P1hi+$\beta$.P2hi+$\gamma$.P3hi.

* * * * *